(12) United States Patent
Strasser et al.

(10) Patent No.: US 9,548,601 B2
(45) Date of Patent: *Jan. 17, 2017

(54) ENVIRONMENTALLY SEALED CABLE BREAKOUT ASSEMBLIES

(71) Applicant: HUBER+SUHNER AG, Herisau (CH)

(72) Inventors: Martin Strasser, Waldkirch (CH);
David Torri, Des Plaines, IL (US);
Axel Vega, Arlington Heights, IL (US);
Nasir Mahmood, Chicago, IL (US);
Randall Whitcomb, South Burlington, VT (US)

(73) Assignee: Huber + Suhner AG, Herisau (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/868,720

(22) Filed: Sep. 29, 2015

(65) Prior Publication Data
US 2016/0049782 A1     Feb. 18, 2016

Related U.S. Application Data

(63) Continuation of application No. 13/817,589, filed as application No. PCT/EP2011/054276 on Mar. 21, 2011, now Pat. No. 9,182,564.

(Continued)

(51) Int. Cl.
*G02B 6/44*    (2006.01)
*H02G 7/20*    (2006.01)
(Continued)

(52) U.S. Cl.
CPC .............. *H02G 7/20* (2013.01); *G02B 6/4416* (2013.01); *G02B 6/4471* (2013.01);
(Continued)

(58) Field of Classification Search
CPC ... G02B 6/4471; G02B 6/4472; H02G 3/0406; H02G 15/117
(Continued)

(56) References Cited

U.S. PATENT DOCUMENTS 3,254,153 A    5/1966 Kohler
4,029,895 A    6/1977 Scarborough
(Continued)

FOREIGN PATENT DOCUMENTS

CN    201352702 Y    11/2009
DE    78 19 539 U1    11/1978
(Continued)

OTHER PUBLICATIONS

International Search Report (Application No. PCT/EP2011/054276) dated Jun. 14, 2011.
International Search Report dated Jun. 14, 2011.

*Primary Examiner* — Ryan Lepisto
(74) *Attorney, Agent, or Firm* — Burr & Brown, PLLC

(57) ABSTRACT

A cable breakout assembly is provided, including a feeder cable, a breakout structure having a first end threadedly engaged with a cable nut having a single-port cable gland through which the feeder cable extends, a central conduit which houses the sections of the feeder cable passing there through, and an opposed second end threadedly engaged with a cable nut having a multi-port cable gland, whose number of ports corresponds to the number of splices of the feeder cable. A plurality of environmentally sealed, flexible conduits are provided, each having a first end that interfaces with and extends from a respective port of the multi-port gland, and a second end adapted to interface with an external device, wherein each flexible conduit houses a respective spliced section of the feeder cable therein.

10 Claims, 12 Drawing Sheets

Related U.S. Application Data

(60) Provisional application No. 61/384,827, filed on Sep. 21, 2010.

(51) Int. Cl.
  *H02G 3/04* (2006.01)
  *H02G 15/117* (2006.01)
  *H01B 7/00* (2006.01)

(52) U.S. Cl.
  CPC ......... *G02B 6/4472* (2013.01); *H01B 7/0045* (2013.01); *H02G 3/0406* (2013.01); *H02G 15/117* (2013.01); *G02B 6/4465* (2013.01); *G02B 6/4476* (2013.01)

(58) Field of Classification Search
  USPC ........................................................ 385/135
  See application file for complete search history.

(56) References Cited

U.S. PATENT DOCUMENTS

| | | | |
|---|---|---|---|
| 4,312,563 A | 1/1982 | Mead | |
| 4,422,890 A | 12/1983 | Penneck | |
| 4,626,067 A | 12/1986 | Watson | |
| 4,697,873 A | 10/1987 | Bouvard et al. | |
| 4,721,358 A | 1/1988 | Faber et al. | |
| 4,736,072 A | 4/1988 | Hvidsten | |
| 4,814,118 A | 3/1989 | Plummer et al. | |
| 4,822,127 A | 4/1989 | Kamiya et al. | |
| 4,902,856 A | 2/1990 | Miller | |
| 5,066,095 A | 11/1991 | Dekeyser et al. | |
| 5,119,457 A | 6/1992 | Callahan | |
| 5,208,428 A | 5/1993 | Foss | |
| 5,381,501 A | 1/1995 | Cardinal et al. | |
| 5,442,140 A | 8/1995 | McGrane | |
| 5,491,766 A | 2/1996 | Huynh et al. | |
| 5,502,280 A | 3/1996 | Rocci et al. | |
| 6,152,767 A | 11/2000 | Roosen et al. | |
| 6,195,487 B1 | 2/2001 | Anderson et al. | |
| 6,236,789 B1 | 5/2001 | Fitz | |
| 6,389,214 B1 | 5/2002 | Smith et al. | |
| 6,738,555 B1 | 5/2004 | Cooke et al. | |
| 6,963,690 B1* | 11/2005 | Kassal .................. | G02B 6/3817 385/137 |
| 7,045,710 B1 | 5/2006 | Allen et al. | |
| 7,409,127 B1 | 8/2008 | Hurley et al. | |
| 7,664,363 B1 | 2/2010 | Mowery, Sr. | |
| 8,737,786 B1 | 5/2014 | Compton et al. | |
| 9,057,862 B2* | 6/2015 | Strasser ............... | G02B 6/4471 |
| 9,182,564 B2* | 11/2015 | Strasser ............... | G02B 6/4471 |
| 2004/0126069 A1* | 7/2004 | Jong .................... | G02B 6/3878 385/109 |
| 2004/0156611 A1 | 8/2004 | Cloud et al. | |
| 2004/0262025 A1 | 12/2004 | Brandt et al. | |
| 2005/0259928 A1 | 11/2005 | Elkins, II et al. | |
| 2006/0120672 A1 | 6/2006 | Cody et al. | |
| 2006/0121775 A1 | 6/2006 | Wobben | |
| 2006/0291792 A1 | 12/2006 | Vo et al. | |
| 2007/0047895 A1 | 3/2007 | Parikh et al. | |
| 2007/0110376 A1 | 5/2007 | Buthe et al. | |
| 2008/0138020 A1 | 6/2008 | Robinson et al. | |
| 2008/0181570 A1 | 7/2008 | Mullaney | |
| 2009/0065236 A1 | 3/2009 | Taylor et al. | |
| 2009/0065237 A1 | 3/2009 | Evoniuk et al. | |
| 2009/0103876 A1 | 4/2009 | Kluwe et al. | |
| 2009/0152004 A1 | 6/2009 | Bonvallat et al. | |
| 2009/0269013 A1* | 10/2009 | Durand ................ | H01R 13/748 385/77 |
| 2009/0304339 A1 | 12/2009 | Ohtsuka et al. | |
| 2010/0034507 A1 | 2/2010 | Sielaff | |
| 2010/0054678 A1 | 3/2010 | DiMarco | |
| 2011/0317975 A1 | 12/2011 | Lu et al. | |
| 2012/0027361 A1 | 2/2012 | Brower et al. | |
| 2012/0051707 A1 | 3/2012 | Barnes et al. | |
| 2012/0121228 A1 | 5/2012 | Hsing | |
| 2013/0014974 A1 | 1/2013 | Burke et al. | |
| 2013/0108227 A1 | 5/2013 | Conner | |
| 2013/0146355 A1 | 6/2013 | Strasser et al. | |
| 2013/0170801 A1 | 7/2013 | Do et al. | |
| 2013/0294735 A1 | 11/2013 | Burris et al. | |
| 2013/0336622 A1 | 12/2013 | Islam | |
| 2014/0064681 A1 | 3/2014 | Register, III et al. | |
| 2014/0153876 A1 | 6/2014 | Dendas et al. | |

FOREIGN PATENT DOCUMENTS

| | | |
|---|---|---|
| DE | 32 27 770 A1 | 1/1984 |
| DE | 33 02 677 A1 | 8/1984 |
| DE | 89 03 187 U1 | 5/1989 |
| DE | 37 43 469 A1 | 7/1989 |
| DE | 92 10 937 U1 | 11/1992 |
| DE | 100 08 613 A1 | 9/2001 |
| EP | 0 094 848 A2 | 11/1983 |
| EP | 0 189 609 B1 | 5/1990 |
| EP | 0 520 946 A1 | 12/1992 |
| EP | 0 582 744 A1 | 2/1994 |
| EP | 0 753 773 A1 | 1/1997 |
| EP | 0 862 254 A2 | 9/1998 |
| EP | 1 760 508 A1 | 3/2007 |
| EP | 2 096 730 A1 | 9/2009 |
| GB | 2 042 817 A | 9/1980 |
| GB | 2 218 280 A | 11/1989 |
| KR | 2011-0004827 U | 5/2011 |
| NL | 8 800 669 A | 10/1989 |
| WO | 94/23471 A1 | 10/1994 |
| WO | 95/15602 A1 | 6/1995 |
| WO | 00/38291 A1 | 6/2000 |
| WO | 2010/084343 A2 | 7/2010 |
| WO | 2012/168292 A2 | 12/2012 |
| WO | 2013/139649 A1 | 9/2013 |

\* cited by examiner

1 to 3 CABLE SPLIT CONSTRUCTION

Materials:
- Splice Crimp: Tin Plated Copper
- Shrink Tube Boot: Cross-Linked Polyolefin (-55 to 100C, Adhesive Lined)
- Shrink Tube: Polyolefin (-55 to 110C, Adhesive Lined)

1/2" SHRINK TUBE OVER-LAP ON EACH SIDE OF SPLICE

SHRINK TUBE BOOT (1 LARGE CABLE SPLIT TO 3 SMALL CABLES)

6 CONDUCTORS OF 6, 8, OR 10 AWG CABLE PLUS 3 DRAIN WIRES (1 CONDUCTOR SHOWN FOR CLARITY)

6 CONDUCTOR FEEDER CABLE (PLUS 3 DRAIN WIRES)

1" BOOT OVER-LAP ON OUTER CABLE JACKETS (ALL 4 ENDS)

SPLICE CRIMP

SHRINK TUBE

2 CONDUCTORS OF 12 AWG CABLE TO RADIOS PLUS 1 DRAIN WIRE (1 SHOWN)

MINIMUM OF 1" LOOSE CABLE TO SHRINK TUBE

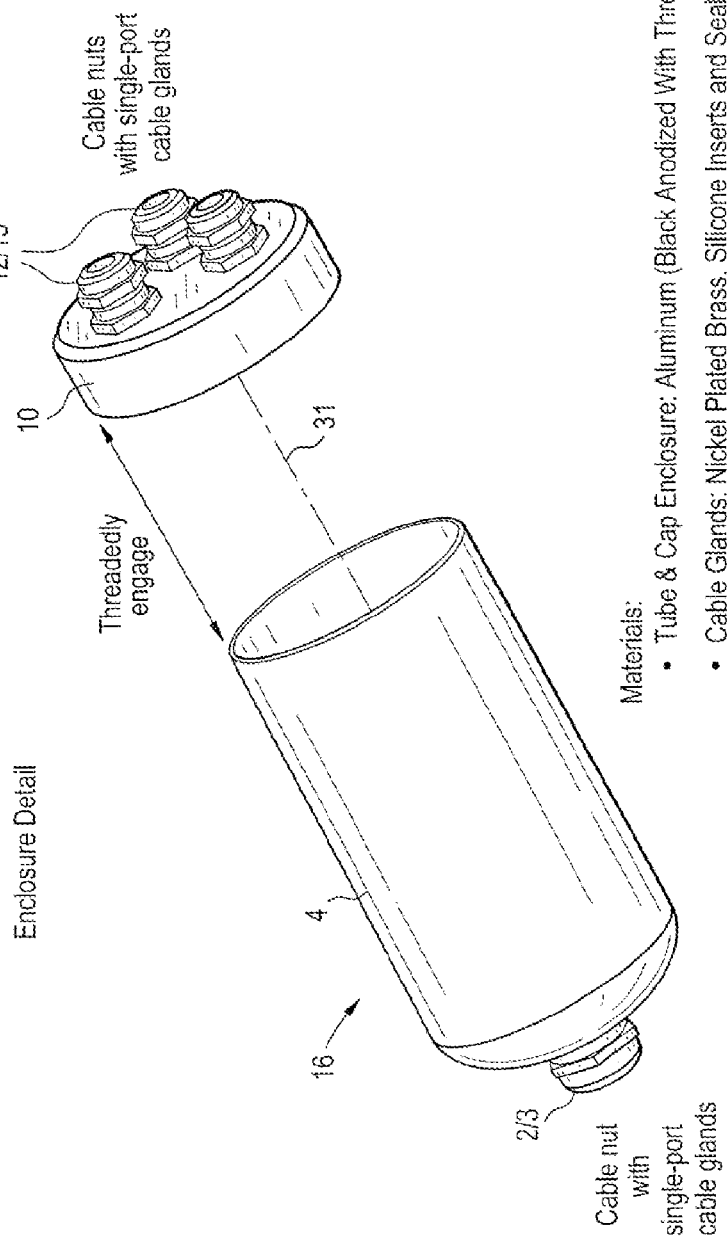

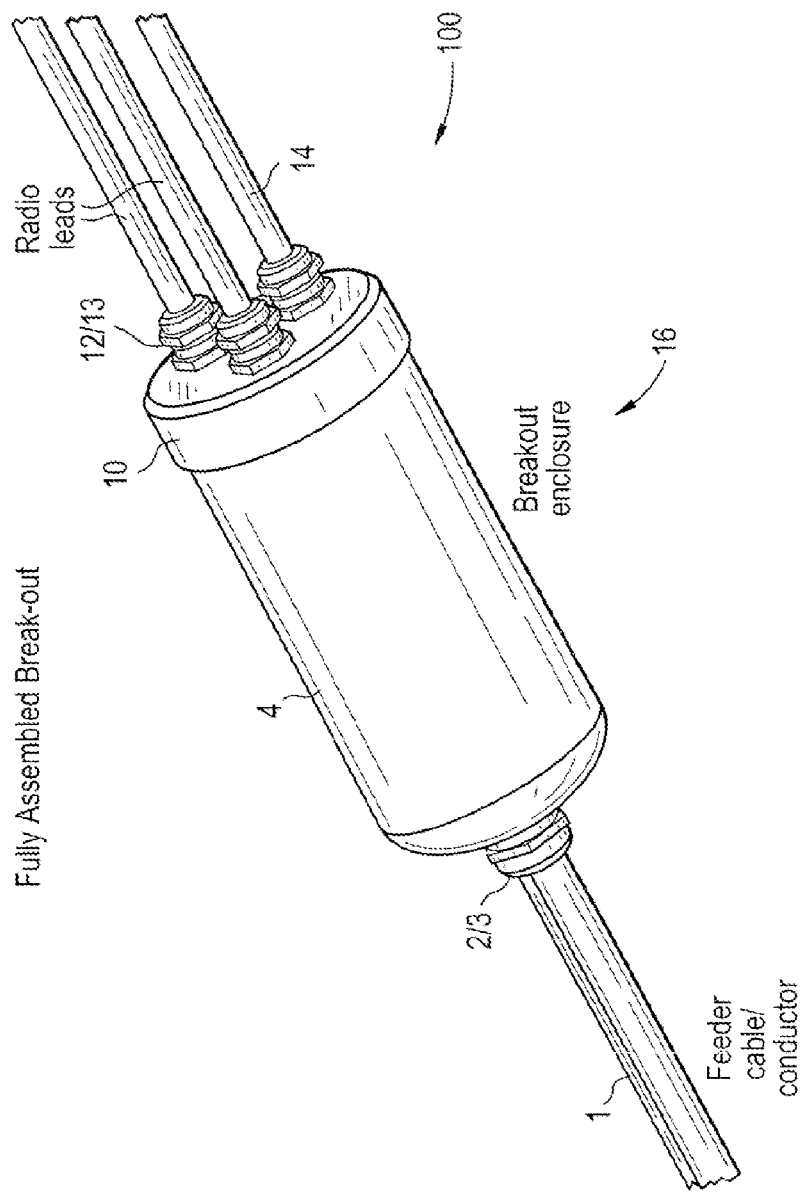

ENVIRONMENTALLY SEALED CABLE BREAKOUT ASSEMBLIES

CROSS REFERENCE TO RELATED APPLICATIONS

This application is a continuation of U.S. application Ser. No. 13/817,589, filed Feb. 19, 2013, which in turn is the National Stage of International Application No. PCT/EP2011/054276, filed Mar. 21, 2011, which in turn claims the benefit of Provisional Application No. 61/384,827, filed Sep. 21, 2010, the entireties of which are incorporated herein by reference.

FIELD OF THE INVENTION

The present invention relates to a cable breakout assembly remote radio heads (RRH).

BACKGROUND OF THE INVENTION

Radio heads and other equipment for amplifying and transmitting signals from antenna towers were traditionally positioned at the base of the tower in order to better facilitate the installation and maintenance thereof. However, there has been a problem with respect to the signal losses experienced and the power consumption involved in this configuration.

So called remote radio heads (RRH) have become an important subsystem of todays new distributed base stations. The remote radio head in general contains the base station's RF circuitry plus analog-to-digital/digital-to-analog converters and up/down converters. RRHs may also have operation and management processing capabilities and a standardized optical interface to connect to the rest of the base station. Relocating the transmission and amplification components to the top of the tower served to reduce the signal losses and power requirements, however, even though the signal was run through the feeder cable extending up the tower, it was also necessary to run a DC power cable up the tower in order to boost the signal power to the individual amplifiers. Also, this type of prior art system required a separate feeder cable to be connected with the individual radio leads for each amplifier at the top of the tower.

This construction presents problems in that a larger number of cables are required to run up the tower, which involves a number of cable pulls, and also undesirably occupies space on the tower. This is especially costly when one considers that the installation costs are increased with more cables, because installers typically charge per cable pull required, and the overall costs are increased because tower owners may charge by the number of cables. The added weight of numerous cables can be a drawback, as well as wind loading issues related to multiple-cable configurations on the tower. In addition, the use of more components introduces the potential for increased installation steps, and more maintenance issues associated with more connections.

SUMMARY OF THE INVENTION

It is an object of the present invention to overcome the drawbacks associated with the prior art noted above.

Accordingly, the present invention provides the ability to provide a single power feeder cable and associated assembly that can provide power to a number of individual amplifiers at the top of a radio (cell) tower. In addition, the invention offers the ability to exchange data with the RRH in a single cable. The construction according to the present invention reduces the number of cables extending up the tower and cable pulls, and reduces the number of connections required. At the top of the tower, a single feeder cable interfaces with a number of radio leads for amplifiers within an environmentally sealed container or through sealed, flexible conduits.

According to one embodiment of the present invention, a cable breakout structure is provided. The number of breakouts is ultimately determined by the size of the feeder cable, where a larger feeder cable can provide a greater number of breakouts, as would be understood by those skilled in the art. For example, a 6-conductor feeder cable is spliced 3 times, so each splice section includes a hot, a neutral and a drain wire. The wires of each spliced section of the feeder cable is crimped together with two conductors and a drain wire of a respective radio cable at splice crimps that are made, for example, of thin plated copper. Each splice/crimp section is sealed with a shrink tube (e.g. a ½ inch shrink tube) that encloses the spliced/crimped portions and extends, at each end, over a portion of the cable jackets of the spliced feeder cable and the radio lead cables, respectively. In that manner, six individually sealed splice crimps are provided as an interface between one feeder cable and three separate radio leads. The overall area of the splice/crimp sections is also sealed, for example, within a shrink tube boot, which also overlaps, at its four ends, the feeder cable jacket and the cable jackets of the respective radio leads.

This cable breakout section is then sealed within a cable breakout enclosure. The cable breakout enclosure is a hollow can structure having two separate portions, each of which includes an open end in communication with the space within the enclosure, and a substantially closed end. The closed end of the "bottom" or can portion includes a cable nut having a single cable gland, which is sealed with respect to the opening in the closed end of the bottom portion from which it extends, and through which the feeder cable extends. The single cable gland is ultimately environmentally sealed with respect to the jacket of the feeder cable. The closed end of the "top" or lid portion includes, in this case (see FIGS. 1, 3 and 4), three separate cable nuts each having a single-port cable gland in sealed connection therewith and extending therefrom, and through which the respective radio leads each extend, each of which are ultimately environmentally sealed with respect to the radio lead cable jackets, the opposite ends of which are connected to a radio pig-tail connector to facilitate a direct connection at the tower top. It should be noted that the cable nut can also include a multi-port cable gland through which the respective radio leads extend, as shown, for example, in FIG. 5.

The two open ends of the respective portions of the cable breakout enclosure are threaded together and sealed with a permanent bond adhesive, suitable examples of which include, but are not limited to, thread locker, adhesives, water blocks and gels. Thereby, the cable breakout enclosure provides further environmental protection and added mechanical stability for the cable breakout, and protects the cable breakout from experiencing potentially harmful flexing and reduces weakening or detachment of the spliced joints, for example. Three levels of sealing are thus provided in view of the importance of preventing moisture and contaminants from entering the cable breakout in order to prevent shorts and broken contacts, etc., so as to improve the performance and reliability of the cable breakout and the overall cell performance.

The improved performance and reliability of the cable breakout assembly according to the present invention is also a cost effective solution, in that, for example, using a single feeder cable reduces installation costs (fewer cable pulls, fewer hoist grips, ground straps and support blocks) and tower fees (fewer cables) and, since service is needed less often, if at all, service and maintenance costs are reduced or prevented. In addition, the cable breakout assembly according to this embodiment of the present invention also enables the feeder cable to be supplied on reels at longer lengths (e.g., 200+ m), and provides a "plug and play" feature for direct deployment, with no tools required, which reduces the hardware and installation time.

According to one aspect of the present invention, the cable breakout assembly includes a spool of feeder cable, a portion of a breakout enclosure (can) affixed to an end portion thereof at a location before the feeder cable is spliced, the sealed, splice/crimped breakout section, which is housed within the enclosure and which interfaces with the radio leads crimped thereto, and the radio lead extensions protruding from the other end of the breakout enclosure, which are fitted, for example, with connectors to enable the plug-and-play benefits of the present invention.

According to another embodiment of the present invention, cable breakout structure is provided that also facilitates cable breakout from a single feeder cable running up the tower to multiple radio lead cables positioned at the top. The cable breakout according to this embodiment of the present invention is hereinafter referred to as a splice puck, and provides further advantages in that the size of the breakout is reduced, crimps are eliminated, the assembly is simplified and costs can be further reduced without sacrificing performance and reliability. In addition, a secure level of environmental protection is provided without the need for additional shrink tubes or boots or enclosure structures.

The splice puck is a unitary structure having a central through bore and including three distinct portions, a threaded feeder cable side, a centre conduit portion, and a threaded cable breakout side. The outer diameter of the threaded feeder cable side and the threaded cable breakout side are substantially the same, whereas the centre conduit portion has a smaller outer diameter and includes four flat sides (see FIGS. 7A and 7B), and since the outer shape of the splice puck is that of an "H", the shape facilitates the ability to easily and sufficiently secure the splice puck using a pipe clamp, for example, at the top of the tower. Additionally, the four flat surfaces at the centre of the centre conductor provide a necessary holding surface for use in connection with a wrench during assembly.

The inner diameter of the threaded feeder cable side and the central conduit portion are substantially the same, whereas the inner diameter of the cable breakout side is larger than that of the other two aforementioned sections. The feeder cable side is adapted to threadedly engage a single-port cable gland through which the feeder cable passes, and which is environmentally sealed about the feeder cable using the cable gland features (e.g., includes silicone compression gasket that securely engages the cable jacket). The cable breakout side is adapted to threadedly engage a multi-port cable gland through which individual flexible conduits, which are sealed with a waterproof shrink tube over the outer surfaces thereof and which internally house the separated cable conductor sections, extend. The multi-port cable gland is environmentally sealed onto the respective flexible conduits in the same manner as noted above in connection with the environmental seal between the single-port gland and the feeder cable jacket. The use of individual cable glands is also possible if such use is determined to be advantageous for a particular application.

The ends of the separated cable sections within each of the environmentally protected flexible conduits respectively mate with a device, such as an end of a high pin count Buccaneer connector, which is connected to radio lead cables at its other end. That is to say, in that construction, the Buccaneer connector serves as an interface between the separated feeder cable sections and the respective radio lead cables. Other devices or cables that can interface with the feeder cable sections within the flexible conduits include, but are not limited to Remote Radio Heads (RRH), antennas, Remote Electronic Tilt (RET) and other suitable connectors.

According to another aspect of the second embodiment of the present invention, the cable breakout assembly includes a spool of feeder cable, the splice puck breakout structure affixed to an end portion thereof at a location before the feeder cable is split, and the flexible conduits protruding from the other end of the splice puck breakout structure, which are fitted, for example, with connectors to enable the plug-and-play benefits of the present invention.

When not using a drain wire, grounding through the tube enclosure or splice puck would be maintained through the use of EMI/RFI cord grips. By using such cord grips, an electrical path through the outer shield of the cables (Feeder & Radio Leads) is completed through the cord grip to the cable breakout structure "can" or splice puck. A full description of the EMI/RFI Cord Grips is given in the ContaClip website.

In one embodiment, a cable breakout assembly according to the present invention comprises a feeder cable adapted to be spliced or separated into a plurality of sections, each section including at least a hot wire and a neutral wire. A plurality of radio leads corresponding to the plurality of feeder cable sections, joined to the respective spliced sections of the feeder cable at crimps or similar means. A breakout enclosure including a first portion having a closed end and an open end to enable access to an interior space thereof, a second portion having a closed end and an open end to enable access to an interior space thereof, a cable nut having a single port cable gland installed in and extending from the closed end of the first portion and through which the feeder cable extends, and one or more cable nuts each having at least a single-port cable gland, so that a total number of ports corresponds to the plurality of radio leads, installed in and extending from the closed end of the second portion and through which respective ends of the radio leads extend. A plurality of first environmental sealing structures enclosing each crimp between the spliced sections of the feeder cable and a respective radio lead, and a second environmental sealing structure enclosing each sealed crimp and extending over a portion of a cable jacket of the feeder cable just before the sealed crimps and portions of cable jackets of the respective radio leads just after the sealed crimps and defining a sealed, crimped cable breakout section. The open end of the first portion of the breakout enclosure is threadedly engaged with the open end of the second portion of the breakout enclosure and sealed with a sealant to enclose the sealed, crimped cable breakout section therein. Furthermore, the cable breakout assembly may comprise a feeder cable having a plurality of conductors and being adapted to be separated into a plurality of conductor sections, a breakout structure (splice puck) having a first end threadedly engaged with a cable nut having a single-port cable gland through which the feeder cable extends, a central conduit which houses the sections of the feeder cable passing there through, and an opposed second end threadedly engaged with a cable nut having a multi-port cable gland, whose number of ports corresponds to the number of splices of the feeder cable; and a plurality of flexible conduits, each having a first end that interfaces with and extends from a respective port of the multi-port gland, and a second end adapted to interface with an external device, each flexible conduit housing a respective spliced section of the feeder cable therein.

A preferred cable breakout assembly according to the present invention in general comprises a breakout enclosure with a first end and a second end. A feeder cable is attached to the first end and at least two power feeder pigtail subassemblies are attached to the second end. Each power feeder pigtail subassembly comprises an electrical connector foreseen to be interconnected to a remote radio head. If appropriate the power feeder pigtail subassemblies can be hard wired to a RRH. In an embodiment, the first and the second end of the breakout enclosure are arranged opposite to each other at a distance spaced apart. If appropriate, the first and the second end can be arranged at an angle with respect to each other. A first axis of the feeder cable and second axis of the at least one pigtail subassembly are preferably arranged parallel to each other. Depending on the field of application, they can be arranged at an angle with respect to each other. In one embodiment, the distance between the first axis and the second axis is within a range of 0 to 20 centimeter (cm). In a preferred embodiment, the cable breakout assembly has a hybrid setup with at least one optical feeder pigtail subassemblies, whereby the number of optical feeder pigtail subassemblies corresponds to the number of power feeder pigtail subassemblies.

Furthermore, a feeder cable according to the present invention comprises at least one first empty conduit (ductwork) foreseen to receive at least one optical fibre. The optical fibre is preferably displaceable within and relative to the first empty conduit. If appropriate for each optical fibre a single ductwork can be foreseen. In an embodiment, the first empty conduit ends in a secondary breakout structure in which at least one second empty conduit ends foreseen to receive at least one optical fibre. The second empty conduit is preferably arranged in general opposite to the first empty conduit with respect to the secondary breakout structure. Alternatively or in addition the feeder cable may comprises several first empty conduits, each directly ending in an optical connector of an optical pigtail subassembly.

The breakout enclosure may comprise a bottom part and a top part which are interconnected to each other, e.g. by a thread or in an other manner. The bottom and the top part may be shaped cylindrical. The breakout enclosure may at least partially be filled with a casting resin.

A cable breakout assembly according to the present invention normally comprises a hybrid cable assembly which preferably has factory terminated fibers and an integrated shielded power cable. It becomes possible to install the cable breakout assembly by plug and play installation whereby—in difference to the prior art—no field termination/wrapping/or other preparation is necessary.

BRIEF DESCRIPTION OF THE DRAWINGS

For a better understanding of the present invention, please refer to the detailed description below read in connection with the accompanying drawings which should not be considered limiting to the invention described in the appended claims. The drawings are showing:

FIG. 2 is a schematic cross-sectional view of the sealed splice/crimp portion of the assembly shown in FIG. 1;

FIG. 3 is a perspective assembly view of the breakout enclosure according to the first embodiment of the present invention, as shown in connections with FIGS. 1-2;

FIG. 4 is a perspective assembly view of the breakout enclosure according to FIG. 3, as assembled;

DETAILED DESCRIPTION OF THE INVENTION

Figure 1:
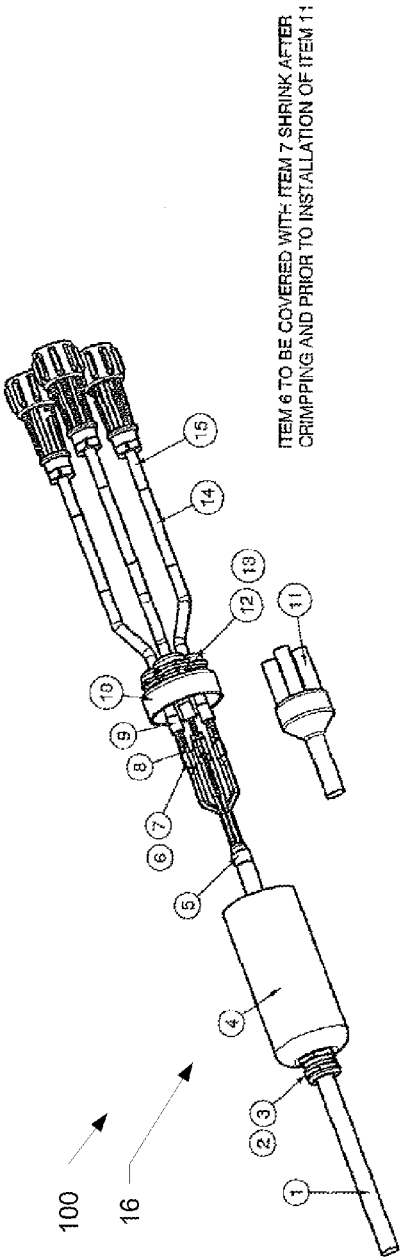
FIG. 1 is an exploded, perspective assembly view of a cable breakout assembly according to the first embodiment of the present invention.

When nothing else is indicated similar parts are indicated with the same reference numerals.

FIG. 1 is an exploded, perspective assembly view of a cable breakout assembly 100 according to the first embodiment of the present invention. The cable breakout assembly 100 includes a feeder conductor wire 1, which is fed through a large cable gland 2 of a large cable nut 3 extending from the closed end of the bottom portion 4 of the breakout enclosure (can) 16. The conductor feeder cable 1 is spliced, crimped with respective radio leads and sealed with shrink tubes, as denoted by numerals 5-9. A shrink boot 11 is fitted over the sealed splice/crimp area denoted by reference numbers 5-9. The crimped, sealed, radio lead sections are fed though three cable glands 12 of respective cable nuts 13 which extend from the closed end of the top portion 10 of the breakout enclosure (can). The respective radio leads are shrink sealed and color coded (as shown by reference numeral 14) and interface with the power feeder pigtail subassembly at reference numeral 15, which are fitted with respective connector devices to enable plug and play connectivity.

FIG. 2 is a schematic cross-sectional view of the sealed splice/crimp portion of the assembly shown in FIG. 1.

FIG. 3 is a perspective assembly view of the breakout enclosure 16 according to the first embodiment of the present invention, as shown in connection with FIGS. 1-2. The breakout enclosure 16 comprises a bottom portion 4 which in a mounted position is threadedly engaged with a top portion 10 along a first axis 31. In the shown embodiment the portions (tube and cap enclosure) 4, 10 of the breakout enclosure 16 are made of aluminum (e.g. black anodized with treaded interface). The cable glands are made of nickel plated brass with silicon inserts and seals (temp. rating −40 to 200° C., IP68 Nema 4x). While a first cable gland 2 is arranged coaxial to the first axis 31 second cable glands 12 are arranged offset to the first axis 31. The axis of the first and the second cable glands 2, 12 are arranged parallel to each other. FIG. 4 is a perspective assembly view of the breakout enclosure 16 according to FIG. 3, as assembled. Visible are the feeder cable/conductor 1, the breakout enclosure 16 and three radio leads 14.

Figure 5:
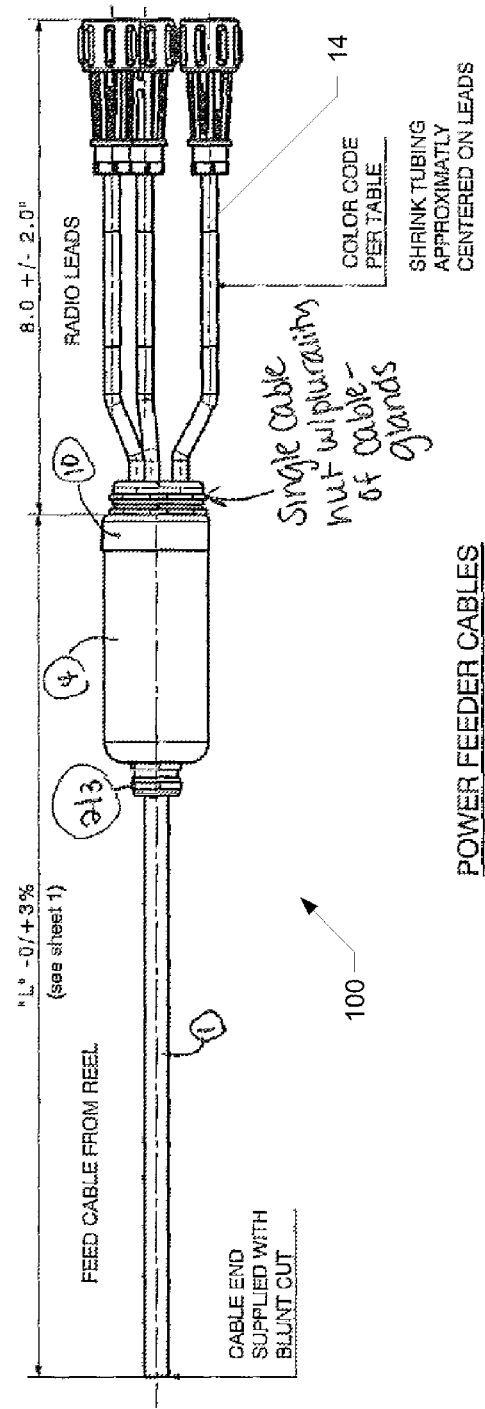
FIG. 5 is an assembled view of a breakout assembly according to another aspect of the first embodiment of the present invention, wherein the top portion of the breakout enclosure is fitted with a plurality of cable glands through which the radio leads extend.

FIG. 5 is an assembled view of a breakout assembly 100 according to another aspect of the first embodiment of the present invention, wherein the top portion of the breakout enclosure is fitted with a cable nut having a multi-port cable gland through which the respective radio leads extend. An example of a 1 to 3 cable split construction of the feeder conductor wire 1 is schematically explained.

Figure 6:
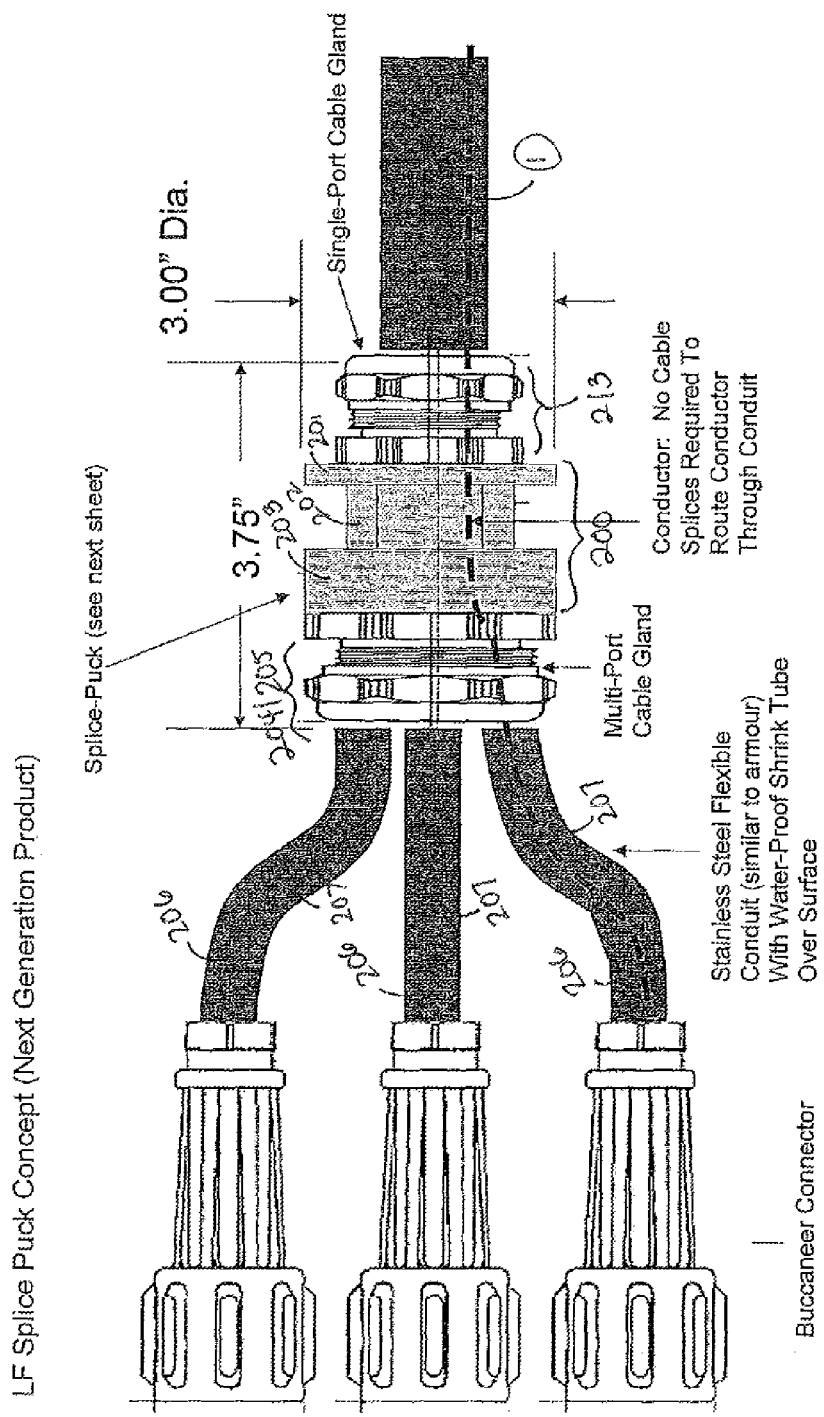
FIG. 6 is a schematic side view of the cable breakout assembly referred to as a splice puck according to the second embodiment of the present invention.
Figure 7:
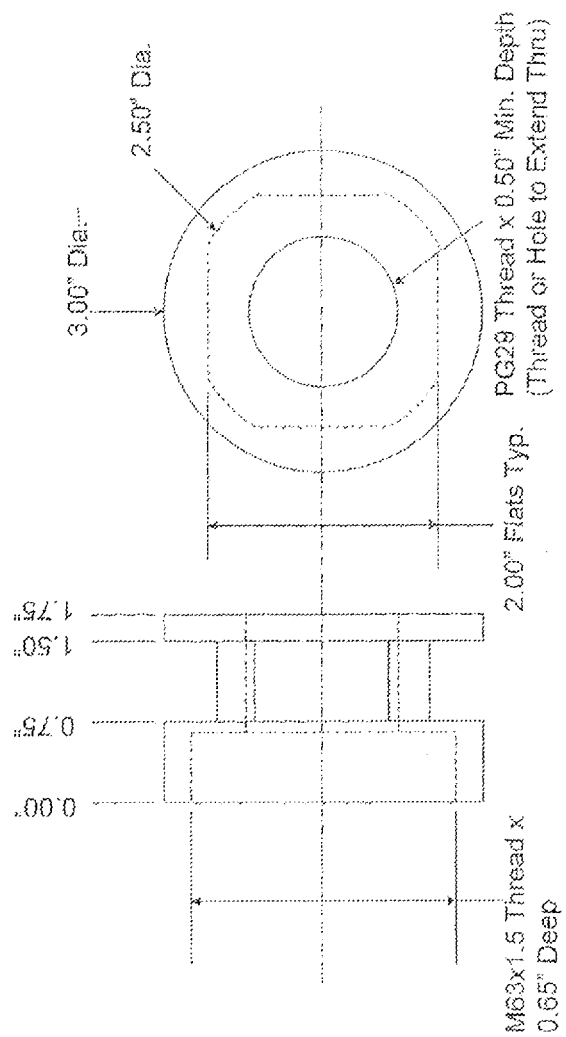
FIGS. 7A and 7B are cross-sectional views of the splice puck breakout assembly shown in FIG. 6.

FIG. 6 is a schematic side view of a cable breakout assembly referred to as a splice puck 200 according to the second embodiment of the present invention, and FIGS. 7A and 7B are cross-sectional views of the splice puck breakout assembly shown in FIG. 6. Suitable examples of materials for the splice puck 200 include, but are not limited to plastic, polycarbonate, nylon, aluminum, stainless steel and other suitable materials. The open cavity of the splice puck 200 can be filled with potting filler in a known manner, if desired, thereby eliminating the chance of environmental contamination.

The conductor cable 1 is fed through a cable nut 3 having a single port cable gland 2 and into the input end 201 of the splice puck 200. The conductors of the cable 1 are routed through the central conduit portion 202 of the splice puck 200 and into the breakout end 203 thereof, which is interfaced with a cable nut 204 having a multi-port cable gland 205. The conductors of the cable 1 pass through the respective ports of the multi-port cable gland 205 and into respective flexible conduits 206, which are sealed with waterproof shrink tubes 207 over the surfaces thereof. The sealed, flexible conduits 206, made, for example, of stainless steel, aluminum, copper or plastic, and having the cable conductors housed therein are respectively connected to connector devices such as, but not limited to, Buccaneer connectors, RRH, RBT, antennas and other suitable connectors.

Figure 8:
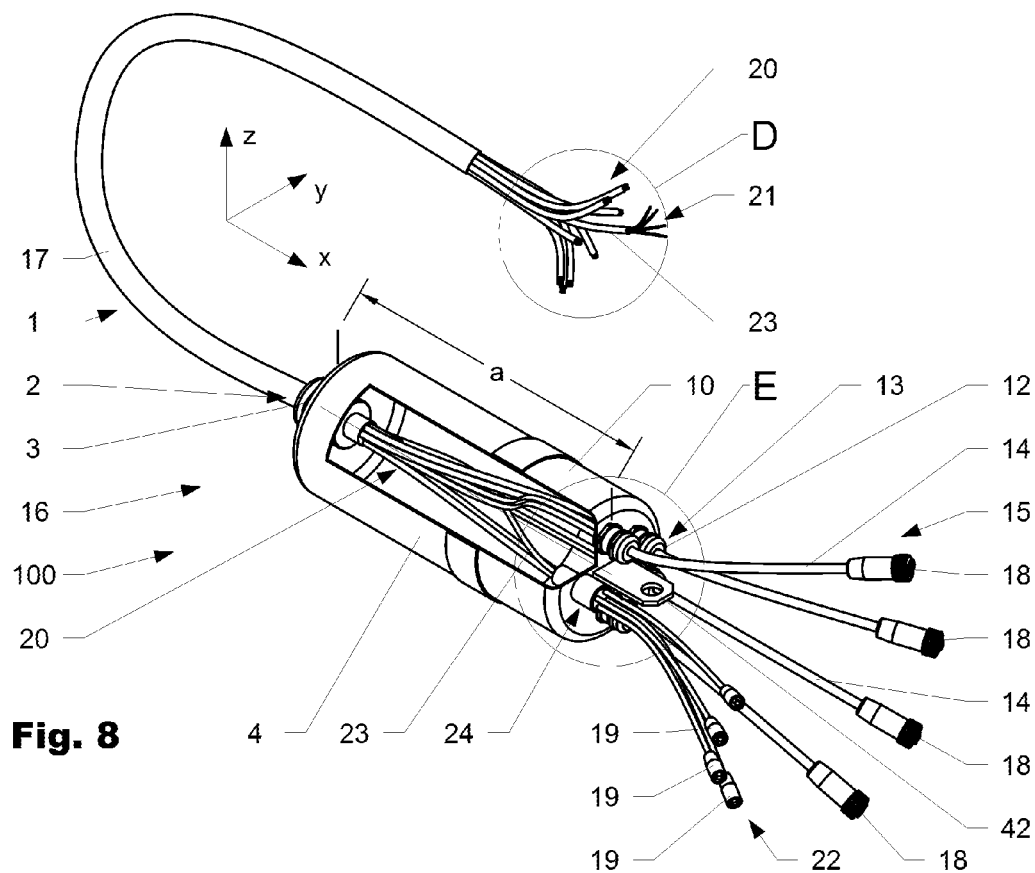
FIG. 8 shows a first embodiment of a hybrid cable breakout assembly in a first perspective view.
Figure 9:
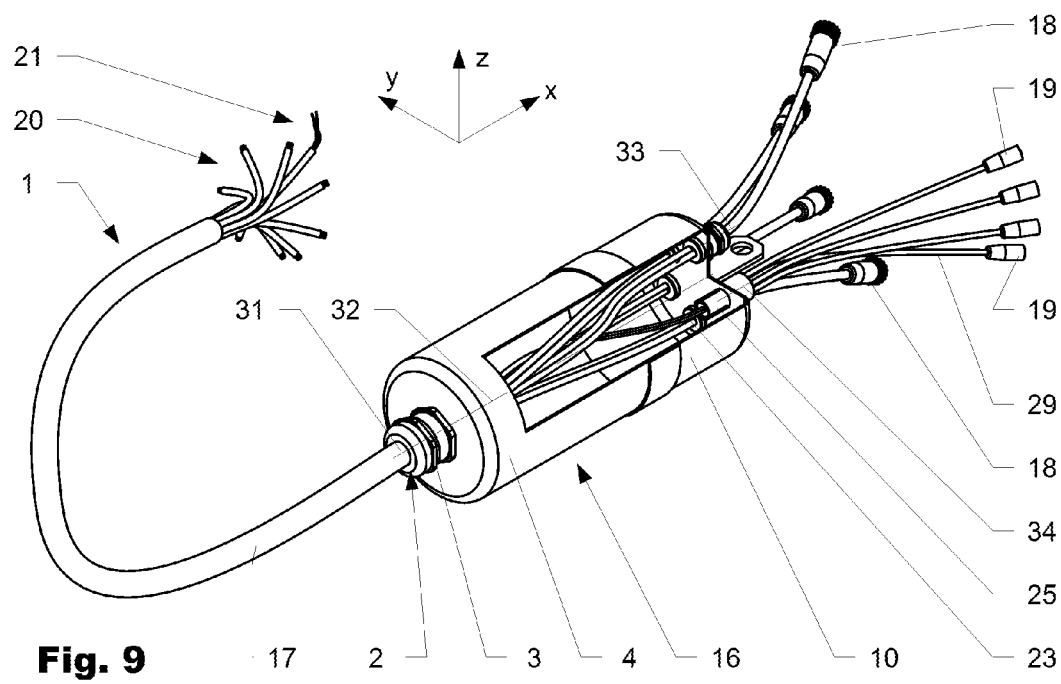
FIG. 9 is the hybrid cable breakout assembly according to FIG. 8 in a second perspective view.
Figure 10:
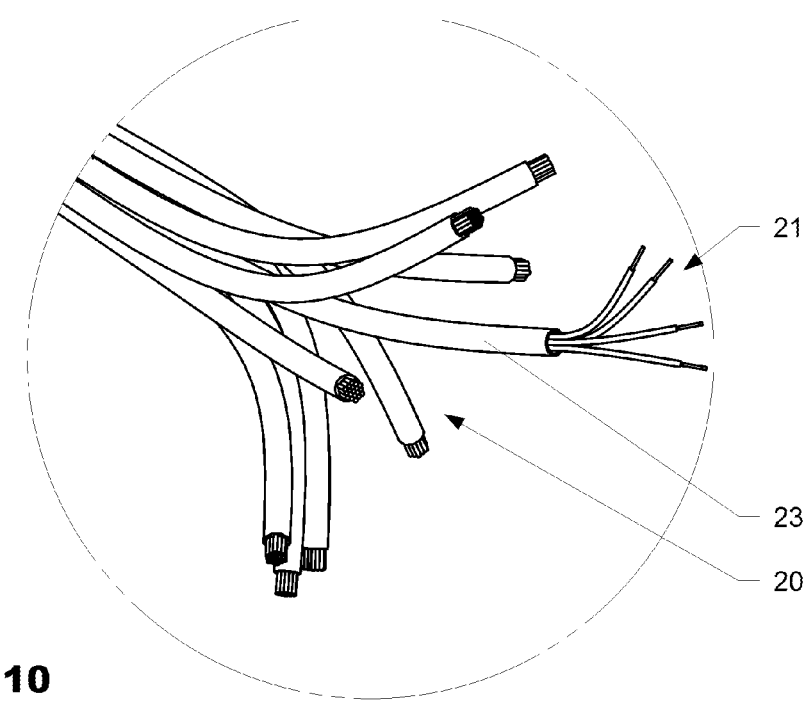
FIG. 10 shows Detail D according to FIG. 8.
Figure 11:
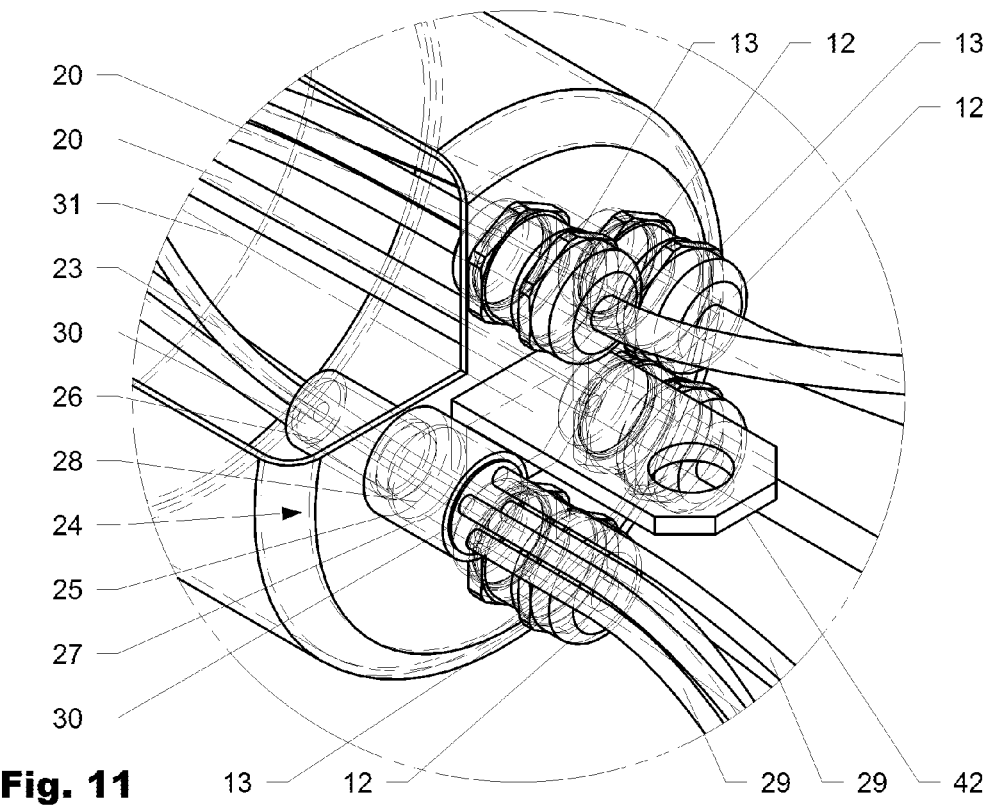
FIG. 11 shows Detail E according to FIG. 8.

FIGS. 8 and 9 are showing a partially cut, perspective assembly view of a cable breakout assembly 100 according to a further embodiment of the present invention. FIG. 10 is showing Detail D and FIG. 11 is showing detail E according to FIG. 8.

The cable breakout assembly 100 includes a feeder conductor wire (feeder cable) 1, which is fed through a large cable gland 2 of a large cable nut 3 extending from the closed end of the bottom portion 4 of the breakout enclosure (can) 16. To offer a view at the inside the breakout closure 16 is displayed in a partially cut manner. The conductor feeder cable 1 has a hybrid configuration and comprises electrical wires 20 and glass fibers 21 within a cable sheath 17. The electrical wires 20 of the feeder cable 1 are interconnected to electrical connectors 18 via pigtail subassemblies 15. Depending on the field of application the electrical wires 20 can run continuously into the pigtail subassemblies 15. Alternatively or in addition the electrical wires 20 can be spliced within the breakout enclosure 16, e.g. a shrink boot is fitted over the sealed splice/crimp area. The crimped, sealed, radio lead sections are fed through four small cable glands 12 of respective small cable nuts 13 which extend from the closed end of the top portion 10 of the breakout enclosure (can) 16. If appropriate the respective radio leads 14 are shrink sealed and color coded and interfaces with the power feeder pigtail subassembly 15, which are fitted with respective connector devices 20 to enable plug and play connectivity.

If appropriate, instead of connecting the connector devices 20 directly to thereto assigned RRHs for power supply, the connector devices 20 can be designed as standardized interfaces which are foreseen to be interconnected indirectly via a specific interface cable or connecting device adapted to the specific RRHs or devices. Therefore complete and standardized factory assembly of the cable breakout assembly 100 according to the present invention becomes even more simplified.

As it can be seen the number of optical fibers 21 corresponds to the number of optical connectors 19 attached to the optical feeder pigtail subassemblies 22. Each optical connector 19 is foreseen to be interconnected directly or indirectly to an associated RRH (not shown in detail) or another device. In a preferred embodiment the optical fibers 21 are not spliced (spliceless arrangement). Instead the feeder conductor cable 1 comprises at least one ductwork (first empty conduit) 23 which ends in the shown embodiment inside of the breakout enclosure 16. The ductwork 23 is foreseen to receive one or several optical fibers 21. Preferably the optical fibers 21 are displaceable with respect to the ductwork 23 in length direction such that the optical fibers 21 can be inserted at a later stage if necessary. If appropriate for each optical fibre 32 an individual ductwork 23 can be foreseen. If required the individual ductworks 23 can be spliced or continuously run into the optical feeder pigtail subassemblies 22. Thereby it is not necessary to splice the optical fibers 21. A further advantage is that the length and position of the optical fibers 21 arranged within the ductwork 23 can be adjusted after the device has been assembled. As it can be seen in FIG. 8 in the shown embodiment the feeder cable 1, the power feeder pigtail subassemblies 15 and the optical feeder pigtail subassemblies 22 are arranged at a distance a with respect to each other.

As best visible in FIG. 11 the shown embodiment the ductwork 23 ends in a secondary breakout structure 24 for the optical fibers 21. In FIG. 11 the invisible lines are shown in a dashed manner. The secondary breakout structure 24 is attached to one end of the breakout housing 16. The secondary breakout structure 24 comprises a splice puck housing 25 in which the ductwork 23 from the feeder cable 1 ends on the inner side. The splice puck housing 25 reaches through an opening of the top portion 10 of the breakout enclosure 16. On its inner end the splice puck housing 25 comprises an inner gland 26 to which the ductwork 23 is attached. The splice puck housing 25 encompasses a cavity 28 in which the ductwork 23 ends. At the opposite end of the cavity 28 an outer gland 27 is arranged to which here four second empty conduits (smaller empty conduits) 29 are attached. In the shown embodiment the ductwork (first empty conduit) 23 and the smaller conduits 29 are attached to the splice puck housing 25 by a casting compound 30. Other methods to attach the empty conduits 23, 29 to the splice puck housing 25 are possible.

In the shown embodiment the first empty conduit 23 is foreseen to receive four optical fibers 21 which are led into the cavity 26. In the cavity 26 the optical fibers 21 are separated and each guided into one of the smaller empty conduits 29. The separated fibers are then guided to the optical connectors 19 arranged at the distal end of the smaller empty conduits 29.

The splice puck housing 25 of the shown embodiment acts as cable gland for the optical fibers 21 with respect to the breakout enclosure 16. If appropriate the splice puck housing 25 can be arranged within the breakout enclosure 16 and the smaller empty conduits 29 can be guided across the splice puck housing 25 by additional cable glands (not shown).

Depending on the field of application the optical fibers 21 can be spliced alternatively or in addition. If appropriate at least one optical connector can be arranged at the inside of the breakout enclosure 16 to interconnect two optical fibers. However these solutions are disadvantageous with respect to the above described spliceless solution.

The breakout enclosure 16 of the shown embodiment comprises an in general cylindrical bottom portion 4 which is arranged concentric along a first axis 31 to and sealing up with the in general cylindrical top portion 10 as described above. A second axis of the first cable gland 2 for the feeder cable 1 is arranged parallel to the third axis 33 of a second cable gland 12 and a fourth axis 34 of the splice puck housing 25 (or the additional cable glands for the empty conduits 29). By this arrangement negative bending especially of the optical fibers 21 can be avoided. In a preferred embodiment the third and the fourth axis 33, 34 of the at least one second cable gland 12 and the at least one splice puck housing 25 (or the additional cable glands for the optical fibers 21) are arranged in general parallel with respect to the first axis 31 of the splice puck housing 25. However, as long as the bending of the optical fibre has not negative impact the first, the second and the fourth axis can be arranged at an angle with respect to each other. For example, depending on the field of application, an angle in the range of 0° to 90° is possible. This can be achieved when the second cable gland 12 and/or the secondary breakout structure 24 are arranged at an inclined section of the breakout enclosure 16.

With respect to the second axis more flexibility is given, because the electrical conductors are less sensitive regarding bending. For example, the second axis of the radio leads 14 can be arranged at an angle of 180° emerging from the breakout enclosure 16 next the first cable gland 2. Depending on the field of application at least the third and the fourth axis 33, 34 are arranged within a radius of 15 cm with respect to the first axis 31.

In the shown embodiment at the pigtail sided end of the breakout enclosure 16, a fastening eye 42 is attached which is for installation and/or transportation use. For example, it is possible to lift the cable breakout assembly 100 by attaching rope (not shown in detail) to the fastening eye 42.

Figure 12:
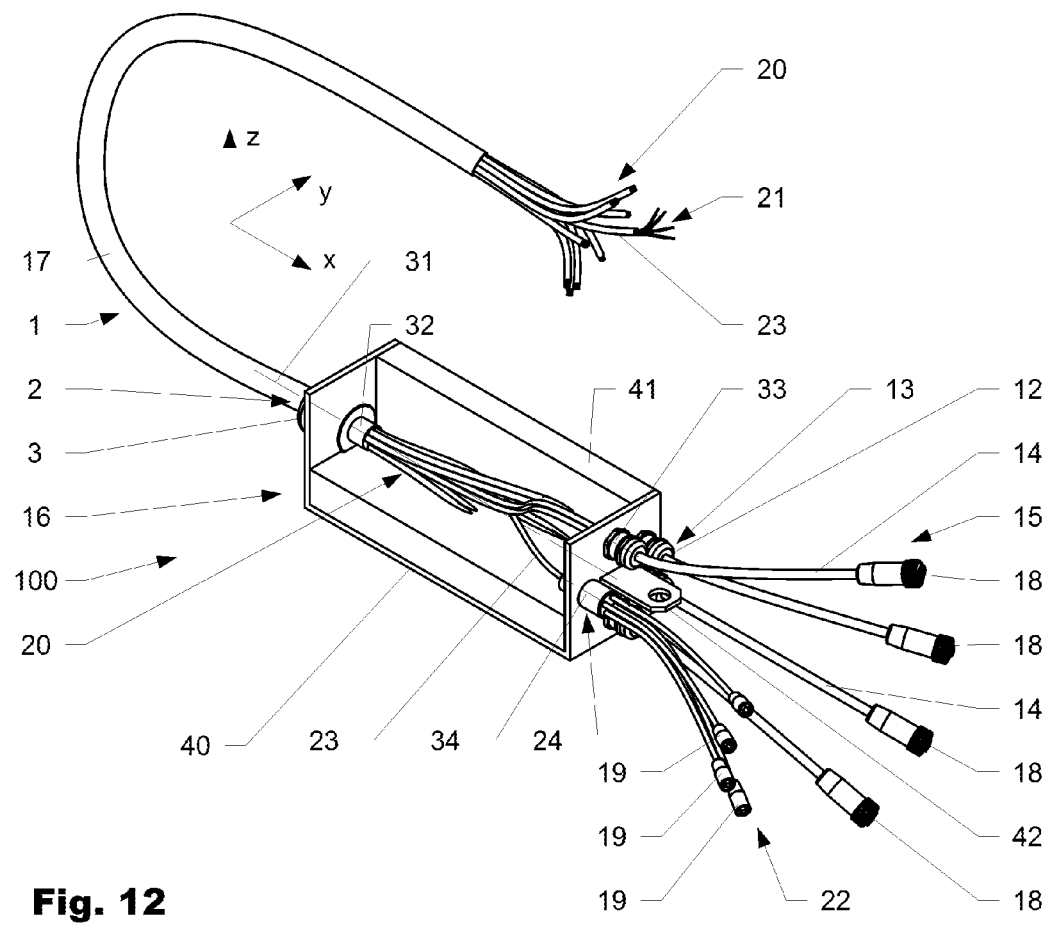
FIG. 12 shows a second embodiment of a hybrid cable breakout assembly in a perspective view.

FIG. 12 shows a further embodiment of the hybrid cable breakout assembly 100 according to the present invention. The general setup is similar to the cable breakout assembly according to FIGS. 8-11. With respect to the general explanations it is therefore referred to these Figs. The cable breakout assembly 100 comprises a different type of breakout enclosure 16 with a U-shaped frame 40 to which the first and second cable glands 2, 12 and the secondary breakout structure 24 are attached for mechanical stability. The inside of the frame 40 is filled with a casting resin 41 which encases and protects the electrical conductors 20 and their splices (not shown in detail). The casting resin 41 is shown in a partially cut manner, such that the encased electrical conductors and ductworks 23 of the optical fibers 21 are visible. If appropriate the large and the small cable glands 2, 12 can be made of casted material.

Figure 13:
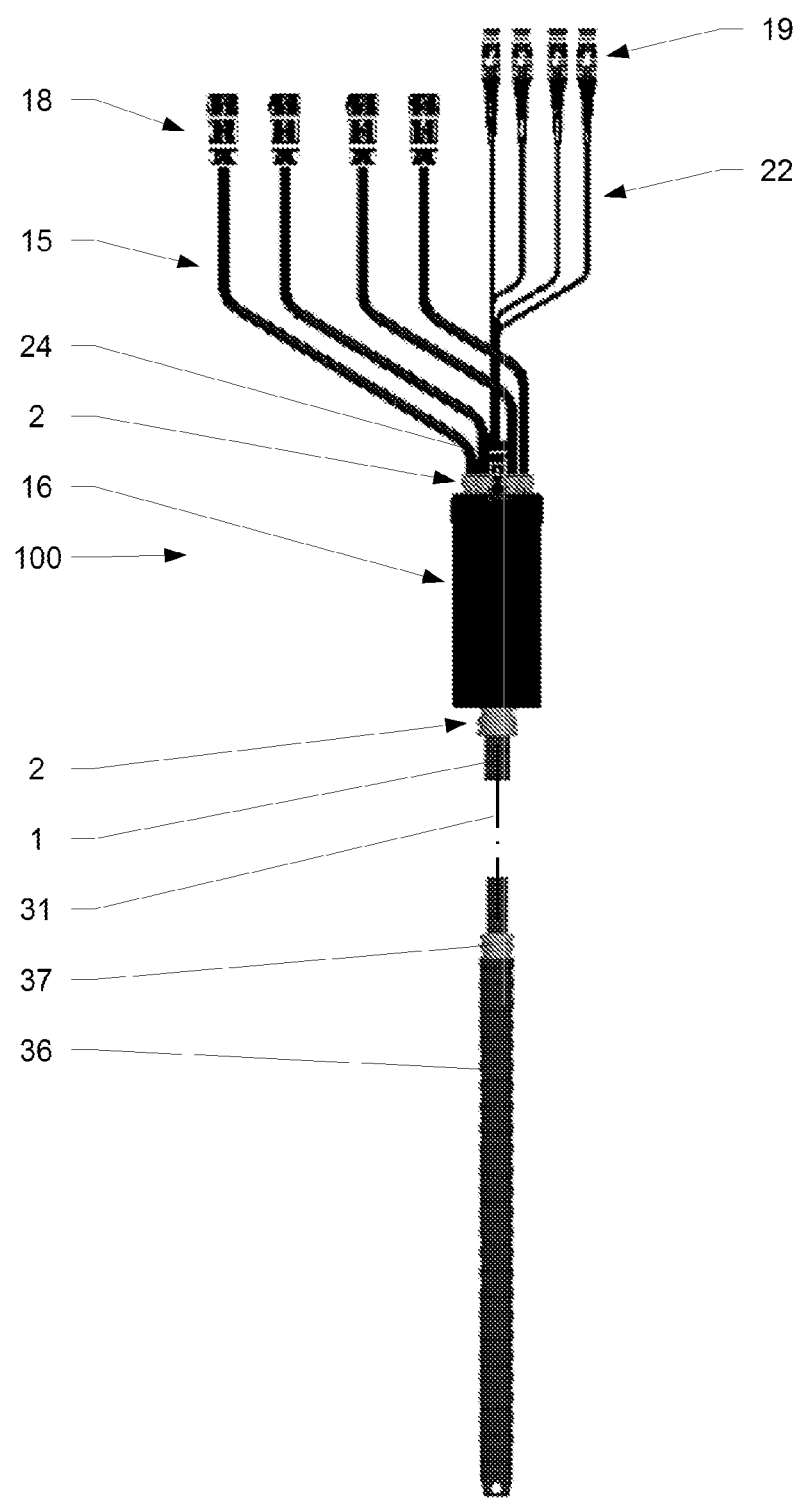
FIG. 13 shows a third embodiment of a hybrid cable breakout assembly.
Figure 14:
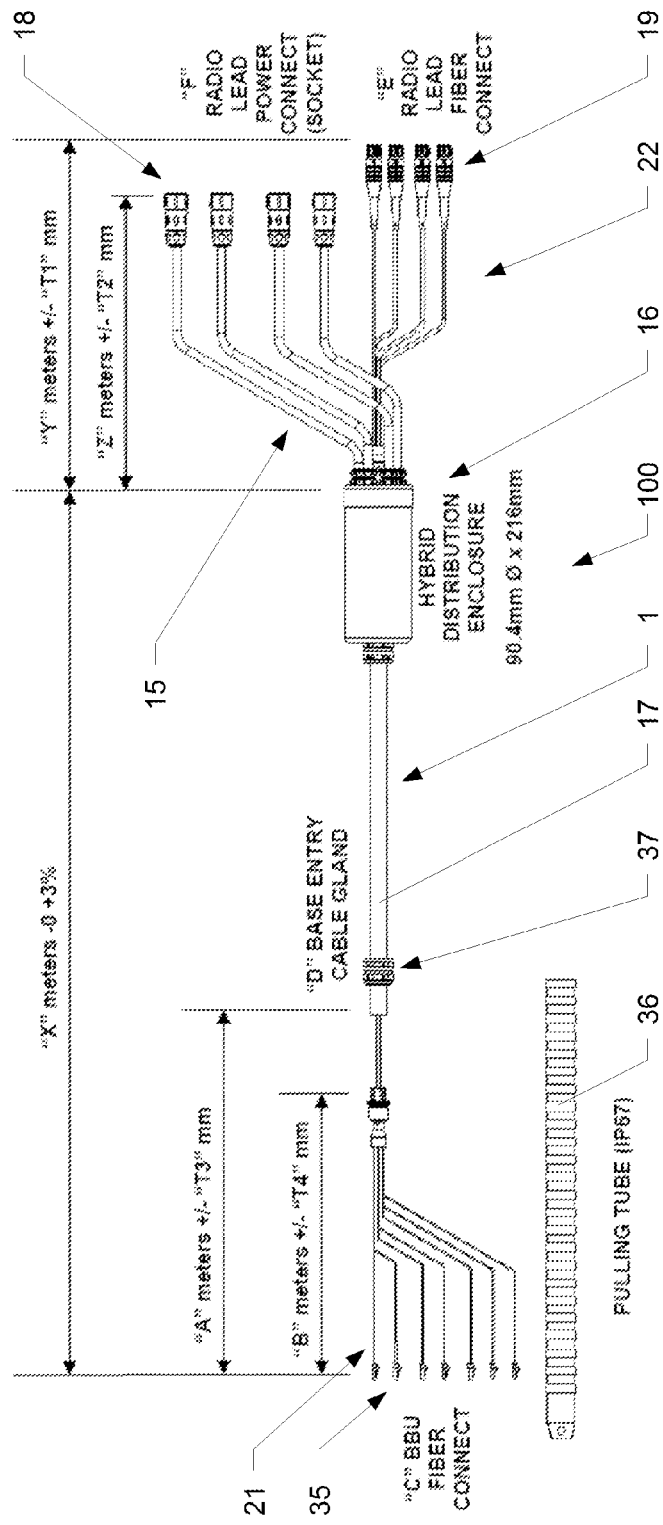
FIG. 14 shows a fourth embodiment of a cable breakout assembly.

FIGS. 13 and 14 are showing different embodiments of cable breakout assemblies 100 according to the present invention. The cable breakout assemblies 100 have a hybrid setup with electrical and optical connectors 18, 19. The cable breakout assemblies 100 are normally manufactured with standardized lengths. As shown in FIG. 14, the standardized lengths ("x" meters) of the feeder cable 1 is, for example, 30, 60 or 90 Meters (m). Depending on the field of application, other dimensions are possible. At the front end, the feeder cable 1 ends in the breakout enclosure 16. At the rear end, the optical fibers 21 end in standardized rear optical connectors 35 (e.g. LC-Connectors). The rear end of the feeder cable 1, include the assembled rear optical connectors 35 and the electrical conductors 20 (not shown in FIG. 15) can be protected by a pulling tube 36 which is put over the rear end and affixed to a base entry cable gland 37 attached to the cable sheet 17 of the feeding cable 1. The cable breakout assembly 100 is preferably made in several configurations, e.g. with three, four or six optical feeder pigtail subassemblies 22 and a corresponding number of power feeder pigtail subassemblies 15. Depending on the field of application, other numbers are possible.

In addition to the above, the tables and diagrams following the abstract are furnished herewith to provide further data regarding specific technical details and beneficial attributes of the various components associated with the present invention, which constitutes part of the original disclosure and which can be used to support future specification descriptions and claims, if necessary. One skilled in the art should appreciate that modifications could be made with respect to the specific examples of the present invention described above without departing from the scope and objects thereof.

LIST OF DESIGNATIONS a Distance between feeder cable and pigtail subassemblies (x-Direction)
1 Feeder conductor wire/conductor cable/feeder cable
2 Large cable gland/first cable gland
3 Large cable nut/cable nut
4 Bottom portion (Breakout enclosure)
5-9 Splice, Crimpe, Shrink Tube
10 Top portion (Breakout enclosure)
11 Shrink Boot
12 Small cable gland (second cable gland)
13 Small cable nut
14 Radio Lead
15 Power feeder pigtail subassembly
16 Breakout enclosure (can)
17 Cable sheath (feeding cable)
18 Electrical connector
19 Optical connector
20 Electrical conductor
21 Glass fibre/Optical fibre
22 Optical feeder pigtail subassembly
23 Ductwork/first empty conduit
24 Secondary breakout structure
25 Splice puck housing
26 Inner gland
27 Outer gland
28 Cavity
29 Second empty conduits/Smaller Empty Conduit
30 Casting compound
31 First axis (breakout enclosure)
32 Second axis (of first cable gland)
33 Third axis (of second cable gland)
34 Fourth axis (of splice puck housing)
35 Rear optical connector
36 Pulling tube
37 Base entry cable gland 40 Frame
41 Casting resin
42 Fastening eye
100 Cable breakout assembly
200 Splice puck
201 Input end
202 Central conduit portion
203 Breakout end
204 Cable nut
205 Multi-port cable gland
206 Flexible conduits

The invention claimed is:

1. A cable breakout assembly comprising
a breakout enclosure having a first end and a second end, the breakout enclosure forming an environmentally sealed container;
a feeder cable attached to the first end of the breakout enclosure and extending in a first direction outside the breakout enclosure away from the first end of the breakout enclosure, the feeder cable having a hybrid configuration comprising electrical wires and optical fibers and comprising at least one first conduit adapted to receive at least one optical fiber, the at least one first conduit ending in a secondary breakout structure in which at least one second conduit ends, wherein the end of the at least one second conduit is arranged opposite to the end of the at least one first conduit;
at least two power feeder pigtail subassemblies attached to the second end of the breakout enclosure and extending in a second direction outside the breakout enclosure away from the second end of the breakout enclosure, wherein the terminal end of each of the at least two power feeder pigtail subassemblies (i) has an electrical connector configured to be interconnected to a remote radio head or (ii) is configured to be hard wired to a remote radio head; and
at least one optical feeder pigtail subassembly attached to the second end of the breakout enclosure and extending in the second direction away from the second end of the breakout enclosure.

2. The cable breakout assembly according to claim 1, wherein the first and the second end of the breakout enclosure are arranged opposite at a distance to each other.

3. The cable breakout assembly according to claim 1, wherein a first axis of the feeder cable and a second axis of at least one of the power feeder pigtail subassemblies are arranged parallel to each other.

4. The cable breakout assembly according to claim 3, wherein a distance between the first axis and the second axis is within the range of 0 to 20 centimeter.

5. The cable breakout assembly according to claim 1, wherein the number of optical feeder pigtail subassemblies corresponds to the number of power feeder pigtail assemblies.

6. The cable breakout assembly according to claim 1, wherein the feeder cable comprises at least one conduit which ends at an optical connector of an optical pigtail subassembly.

7. The cable breakout assembly according to claim 1, wherein the breakout enclosure comprises a bottom part and a top part which are interconnected to each other.

8. The cable breakout assembly according to claim 7, wherein the bottom and the top part are cylindrical and interconnected to each other by a thread.

9. The cable breakout assembly according to claim 1, wherein the breakout enclosure comprises a U-shaped bottom part to which the feeder cable and the at least one pigtail assembly is attached.

10. The cable breakout assembly according to claim 1, wherein the breakout enclosure is at least partially filled with a casting resin.

* * * * *